United States Patent
Onishi et al.

(10) Patent No.: US 9,378,447 B2
(45) Date of Patent: Jun. 28, 2016

(54) CIRCUIT DEVICE, ELECTRONIC APPARATUS, AND IC CARD

(75) Inventors: Kota Onishi, Shiojiri (JP); Nobutaka Shiozaki, Shiojiri (JP); Masaya Ninomiya, Matsumoto (JP); Shigeaki Kawano, Chino (JP)

(73) Assignee: Seiko Epson Corporation, Tokyo (JP)

( * ) Notice: Subject to any disclaimer, the term of this patent is extended or adjusted under 35 U.S.C. 154(b) by 747 days.

(21) Appl. No.: 13/595,075

(22) Filed: Aug. 27, 2012

(65) Prior Publication Data

US 2013/0057070 A1    Mar. 7, 2013

(30) Foreign Application Priority Data

Sep. 1, 2011  (JP) .................................. 2011-190648

(51) Int. Cl.
| | |
|---|---|
| H02J 17/00 | (2006.01) |
| G06K 19/07 | (2006.01) |
| H02J 7/02 | (2016.01) |
| H02J 7/34 | (2006.01) |

(52) U.S. Cl.
CPC ........ G06K 19/0709 (2013.01); G06K 19/0715 (2013.01); H02J 7/025 (2013.01); H02J 7/345 (2013.01); Y10T 307/50 (2015.04)

(58) Field of Classification Search
CPC ........ H01L 31/0583; H02J 3/32; H02J 3/382; H02J 9/061; H02J 1/08; H02J 7/025; H02J 7/345; G06K 19/0709; G06K 19/0715
USPC .......................................................... 307/72
See application file for complete search history.

(56) References Cited

U.S. PATENT DOCUMENTS

| | | | |
|---|---|---|---|
| 4,746,787 A | 5/1988 | Suto et al. | |
| 2003/0214475 A1* | 11/2003 | Izumi et al. | ..................... 345/87 |
| 2005/0246621 A1* | 11/2005 | Ogawa | ................... G06F 3/147 |
| | | | 715/277 |
| 2006/0017659 A1* | 1/2006 | Ogawa | .................. B41J 3/4076 |
| | | | 345/30 |
| 2006/0029250 A1* | 2/2006 | Karaki | ................... B41J 3/4076 |
| | | | 382/100 |
| 2006/0139732 A1* | 6/2006 | Hattori et al. | ................. 359/296 |
| 2006/0238939 A1* | 10/2006 | Miyazaki | ......................... 361/90 |
| 2006/0243806 A1* | 11/2006 | Goodman | ................ G06K 1/12 |
| | | | 235/462.13 |
| 2007/0268207 A1 | 11/2007 | Karaki | |
| 2007/0285347 A1 | 12/2007 | Karaki | |

(Continued)

FOREIGN PATENT DOCUMENTS

| | | |
|---|---|---|
| CN | 1734338 A | 2/2006 |
| CN | 101770204 A | 7/2010 |

(Continued)

*Primary Examiner* — Thienvu Tran
*Assistant Examiner* — Brian K Baxter
(74) *Attorney, Agent, or Firm* — ALG Intellectual Property, LLC

(57) ABSTRACT

A circuit device includes: a first storage control unit which receives power from a power receiving unit which receives power by electromagnetic induction, to perform control of storing charge in a first charge storage unit; a second storage control unit which performs control of storing charge in a second charge storage unit; and a power source supply unit which supplies power source to a system device based on charges stored in the first charge storage unit and the second charge storage unit. The second charge storage unit is a charge storage unit whose charge storage capacitance is smaller than that of the first charge storage unit. The power source supply unit supplies, at the time of system start-up after the start of power reception, power source based on the stored charge of the second charge storage unit to the system device.

13 Claims, 11 Drawing Sheets

(56) References Cited

U.S. PATENT DOCUMENTS

| | | | |
|---|---|---|---|
| 2008/0204197 A1* | 8/2008 | Shionoiri | G06Q 10/08 340/10.1 |
| 2009/0231252 A1* | 9/2009 | Maegawa | 345/87 |
| 2010/0156784 A1* | 6/2010 | Narusawa | G06F 3/03545 345/157 |
| 2010/0165797 A1* | 7/2010 | Asami et al. | 368/204 |
| 2010/0201700 A1* | 8/2010 | Kusumoto et al. | 345/545 |
| 2010/0238158 A1* | 9/2010 | Yoshida | 345/214 |
| 2010/0312625 A1* | 12/2010 | Miller | A63F 1/02 705/14.5 |
| 2011/0176263 A1* | 7/2011 | Yamazaki | G06F 1/263 361/679.01 |

FOREIGN PATENT DOCUMENTS

| | | |
|---|---|---|
| JP | 2008-17592 A | 1/2008 |
| JP | 2011-065507 A | 3/2011 |

* cited by examiner

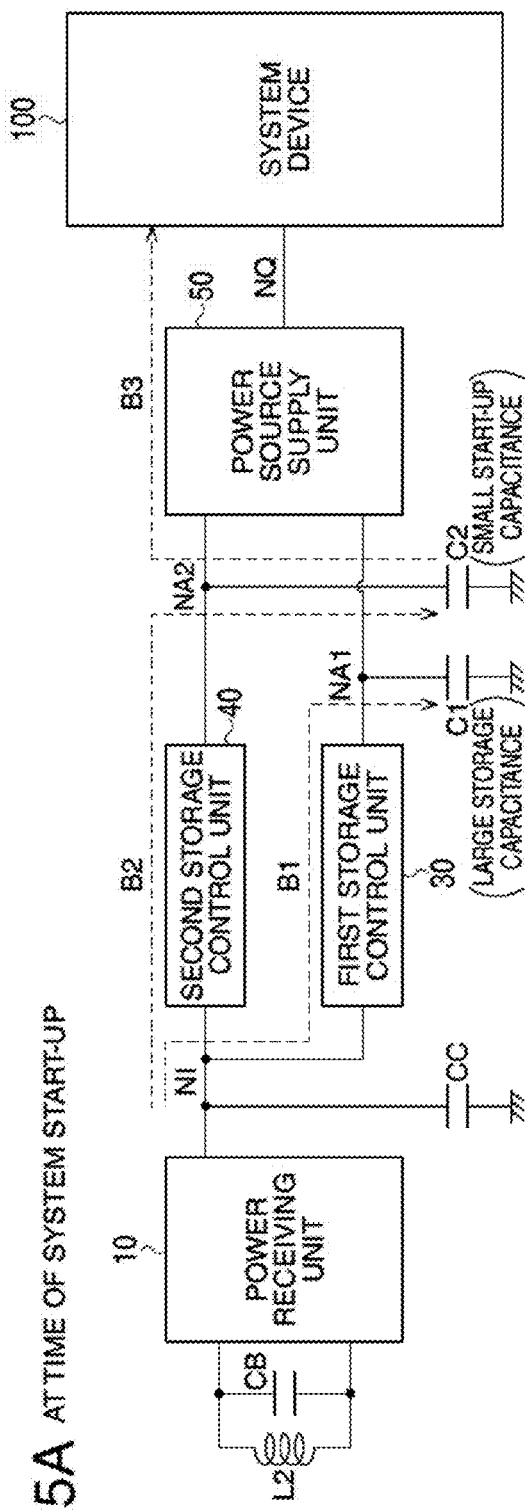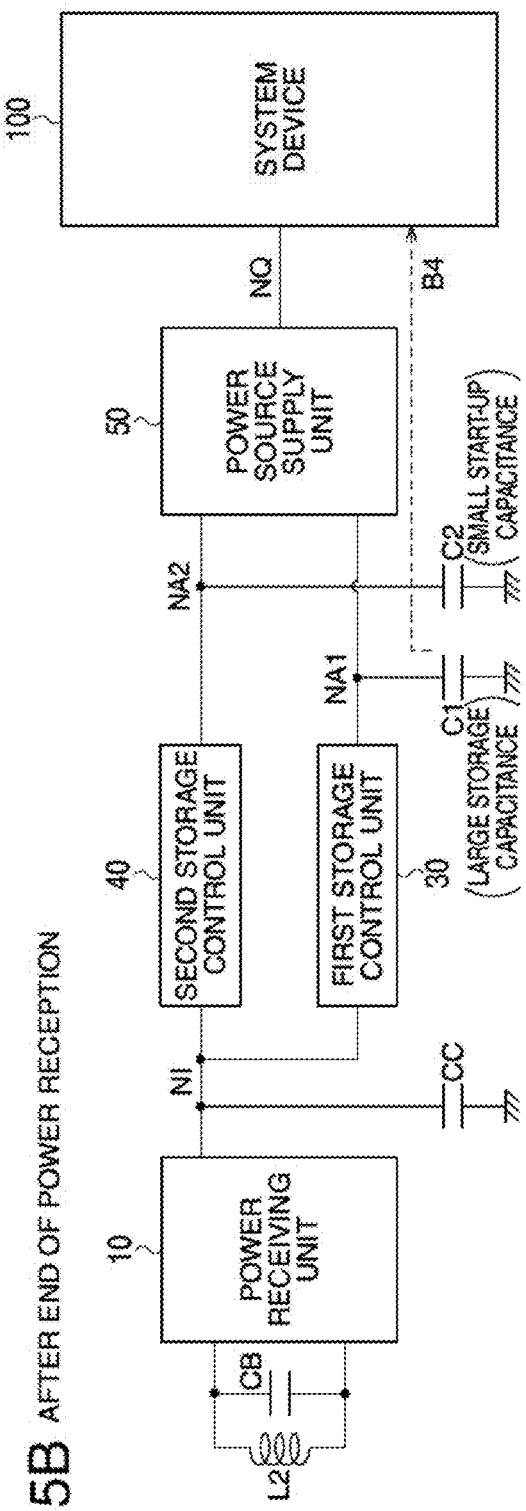

CIRCUIT DEVICE, ELECTRONIC APPARATUS, AND IC CARD

BACKGROUND

1. Technical Field

The present invention relates to a circuit device, an electronic apparatus, an IC card, and the like.

2. Related Art

In recent years, non-contact power transmission (contactless power transmission) which utilizes electromagnetic induction to enable power transmission without metal-to-metal contact has attracted attention. As application examples of the non-contact power transmission, a contactless IC card and the like which can receive power by simply holding the contactless IC card over a terminal device to transmit and receive information have been proposed. According to the contactless IC card, it is possible to realize a card having functions of electronic money, a prepaid card for public transportation systems, an ID card for entry/exit management, and the like.

However, in the contactless IC card in the related art, a display unit which displays various information such as the used amount or remaining value of electronic money or a prepaid card, for example, is not disposed. Because of this, the convenience of a user cannot be quite improved.

On the other hand, as display devices suitable for electronic papers or the like, an EPD (Electrophoretic Display) which is an electrophoretic-type display has been known. In the EPD, since display information can be retained in an unpowered state, there is an advantage that low power consumption and the like can be achieved. Examples of related-art portable information display apparatuses using such an EPD include a technique disclosed in JP-A-2008-17592, for example.

However, in the related-art information display apparatus, not an IC card but a portable mobile apparatus is assumed as its application example, so that an electric double layer capacitor (an EDLC) with a large capacitance is used as a storage unit. Because of this, it takes a longtime to charge by electromagnetic induction from a charger, resulting in a problem that the information display apparatus is not suitable for application to a contactless IC card whose power reception time is extremely short.

SUMMARY

An advantage of some aspects of the invention is to provide a circuit device which enables system start-up and the like in a power reception period of a short time in an apparatus using electromagnetic induction, an electronic apparatus, an IC card, and the like.

An aspect of the invention relates to a circuit device including: a first storage control unit which receives power from a power receiving unit which receives power by electromagnetic induction, to perform control of storing charge in a first charge storage unit; a second storage control unit which receives power from the power receiving unit to perform control of storing charge in a second charge storage unit; and a power source supply unit which supplies power source to a system device based on charges stored in the first charge storage unit and the second charge storage unit, wherein the second charge storage unit is a system-start-up charge storage unit whose charge storage capacitance is smaller than that of the first charge storage unit, and the power source supply unit supplies, at the time of system start-up after the start of power reception by the power receiving unit, power source based on the stored charge of the second charge storage unit to the system device.

In the aspect of the invention, charge based on the power from the power receiving unit is stored in the first charge storage unit by the first storage control unit, and charge based on the power from the power receiving unit is stored in the second charge storage unit by the second storage control unit. Then, the second charge storage unit is the system-start-up charge storage unit whose storage capacitance is small. At the time of system start-up after the start of power reception, power source based on the stored charge of the second charge storage unit is supplied to the system device. By doing this, even when the storage capacitance of the first charge storage unit is large, it becomes possible to promptly supply the power source based on the stored charge of the system-start-up second charge storage unit to the system device. Accordingly, it is possible to provide a circuit device and the like which enable system start-up and the like in a power reception period of a short time in an apparatus using electromagnetic induction.

In one aspect of the invention, the power source supply unit may supply, in a period after the end of power reception by the power receiving unit, power source based on the stored charge of the first charge storage unit to the system device.

With this configuration, it becomes possible to supply, in the period after the end of power reception by the power receiving unit, the power source based on the stored charge of the first charge storage unit whose storage capacitance is large to the system device.

In one aspect of the invention, the system device may perform a display control process of an electrophoretic display unit which displays an image, and the first storage control unit may perform control of storing charge necessary for at least one display rewriting of the electrophoretic display unit in the first charge storage unit.

In this manner, when the amount of charge stored in the first charge storage unit is limited to the charge necessary for at least one display rewriting of the electrophoretic display unit, the storage capacitance of the first charge storage unit need not be increased excessively. With this configuration, it is possible to complete charge storing in the first charge storage unit in a short time, so that it becomes possible to respond to a short power reception period or the like when it is required.

In one aspect of the invention, the power source supply unit may supply power source to the system device after a power supply voltage obtained by the stored charge of the second charge storage unit exceeds a minimum operating voltage of the system device.

With this configuration, it becomes possible to effectively prevent a trouble such as the occurrence of a shoot-through current caused by supplying a power supply voltage equal to or less than the minimum operating voltage to the system device.

In one aspect of the invention, the power source supply unit may include a first diode which is disposed between a first storage node of the first charge storage unit and a connection node and whose forward direction is a direction from the first storage node toward the connection node and a second diode which is disposed between a second storage node of the second charge storage unit and the connection node and whose forward direction is a direction from the second storage node toward the connection node, and the power source supply unit may supply power source to the system device based on a voltage at the connection node.

With this configuration, it becomes possible to effectively utilize the rectifying function of the first and second diodes to supply power supply voltages based on the stored charges of the first and second charge storage units to the system device. Moreover, the use of the first and second diodes in this manner can eliminate the need of a control signal for switch operation. Therefore, even in a situation where the generation of such a control signal is difficult before system start-up, it becomes possible to respond to the situation.

In one aspect of the invention, the power source supply unit may include a switch circuit which is disposed between the connection node and an output node of the power source supply unit and a voltage detection circuit which detects a voltage at the connection node, and the switch circuit may be brought into ON state, when the voltage detection circuit detects that the voltage at the connection node exceeds a given threshold voltage, to supply power source to the system device.

With this configuration, since power source is supplied to the system device after the voltage at the connection node exceeds a given threshold voltage, it becomes possible to effectively prevent a trouble such as the occurrence of a shoot-through current.

Another aspect of the invention relates to an electronic apparatus including: the circuit device according to any of those described above and the system device.

In one aspect of the invention, the system device may perform a display control process of an electrophoretic display unit which displays an image.

When the electrophoretic display unit is used as a display unit in this manner, it is possible to retain display information in a no-power state, so that an improvement in convenience, or the like can be achieved.

In one aspect of the invention, the system device may be supplied with power source based on charge stored in the first charge storage unit in a power reception period of the power receiving unit, to perform a display rewriting process of the electrophoretic display unit in a display rewriting period after power reception.

With this configuration, even when, for example, a long time is required for the display rewriting process of the electrophoretic display unit, it is possible to supply power source based on the charge stored in the first charge storage unit to the system device to complete the display rewriting process of the electrophoretic display unit.

In one aspect of the invention, when the length of the power reception period is defined as T1 and the length of the display rewriting period is defined as T2, the relationship of T2>T1 may be satisfied.

With this configuration, even in the case where the length of the power reception period is short and a long time is required for the display rewriting process of the electrophoretic display unit, it is possible to respond to the case to complete the display rewriting process of the electrophoretic display unit.

In one aspect of the invention, the system device may perform the display rewriting process of the electrophoretic display unit based on data received in the power reception period.

With this configuration, it becomes possible to receive data in, for example, the power reception period and execute, in the subsequent display rewriting period, the display rewriting process of the electrophoretic display unit based on the received data.

Still another aspect of the invention relates to an IC card including: a power receiving unit which receives power by electromagnetic induction; an electrophoretic display unit which displays an image; a system device which performs a display control process of the electrophoretic display unit; and a power source management unit which receives power from the power receiving unit to supply power source to the system device, wherein the system device is supplied with power source based on charge stored in a charge storage unit in a power reception period of the power receiving unit, to perform a display rewriting process of the electrophoretic display unit in a display rewriting period after power reception, and when the length of the power reception period is defined as T1 and the length of the display rewriting period is defined as T2, the relationship of T2>T1 is satisfied.

In the aspect of the invention, the IC card has the power receiving unit, the electrophoretic display unit, the system device, and the power source management unit. Then, power source based on the charge stored in the charge storage unit in the power reception period is supplied to the system device, and the display rewriting process of the electrophoretic display unit is performed. At this time, when the length of the power reception period is defined as T1 and the length of the display rewriting period is defined as T2, the relationship of T2>T1 is satisfied. Accordingly, even in the case where the length of the power reception period is short and a long time is required for the display rewriting process of the electrophoretic display unit, it is possible to respond to the case to complete the display rewriting process of the electrophoretic display unit. As a result, it is possible to incorporate the electrophoretic display unit which requires a long time for the display rewriting process into an IC card, so that an improvement in convenience, or the like can be achieved.

In one aspect of the invention, the power source management unit may include a first storage control unit which receives power from the power receiving unit to perform control of storing charge in a first charge storage unit, a second storage control unit which receives power from the power receiving unit to perform control of storing charge in a second charge storage unit, and a power source supply unit which supplies power source to a system device based on charges stored in the first charge storage unit and the second charge storage unit, the second charge storage unit may be a system-start-up charge storage unit whose charge storage capacitance is smaller than that of the first charge storage unit, and the power source supply unit may supply, at the time of system start-up after the start of power reception by the power receiving unit, power source based on the stored charge of the second charge storage unit to the system device.

With this configuration, even when the storage capacitance of the first charge storage unit is large, it becomes possible to promptly supply the power source based on the stored charge of the system-start-up second charge storage unit to the system device. Accordingly, it is possible to provide an IC card which can receive power using electromagnetic induction and enables system start-up and the like in a power reception period of a short time.

BRIEF DESCRIPTION OF THE DRAWINGS

The invention will be described with reference to the accompanying drawings, wherein like numbers reference like elements.

FIGS. 5A and 5B are explanatory views of the method of the embodiment.

DESCRIPTION OF EXEMPLARY EMBODIMENTS

Hereinafter, a preferred embodiment of the invention will be described in detail. The embodiment described below does not unduly limit the contents of the invention set forth in the appended claims, and not all of the configurations described in the embodiments may necessarily be indispensable as solving means of the invention.

1. Basic Configurations of Circuit Device and Electronic Apparatus

Figure 1:
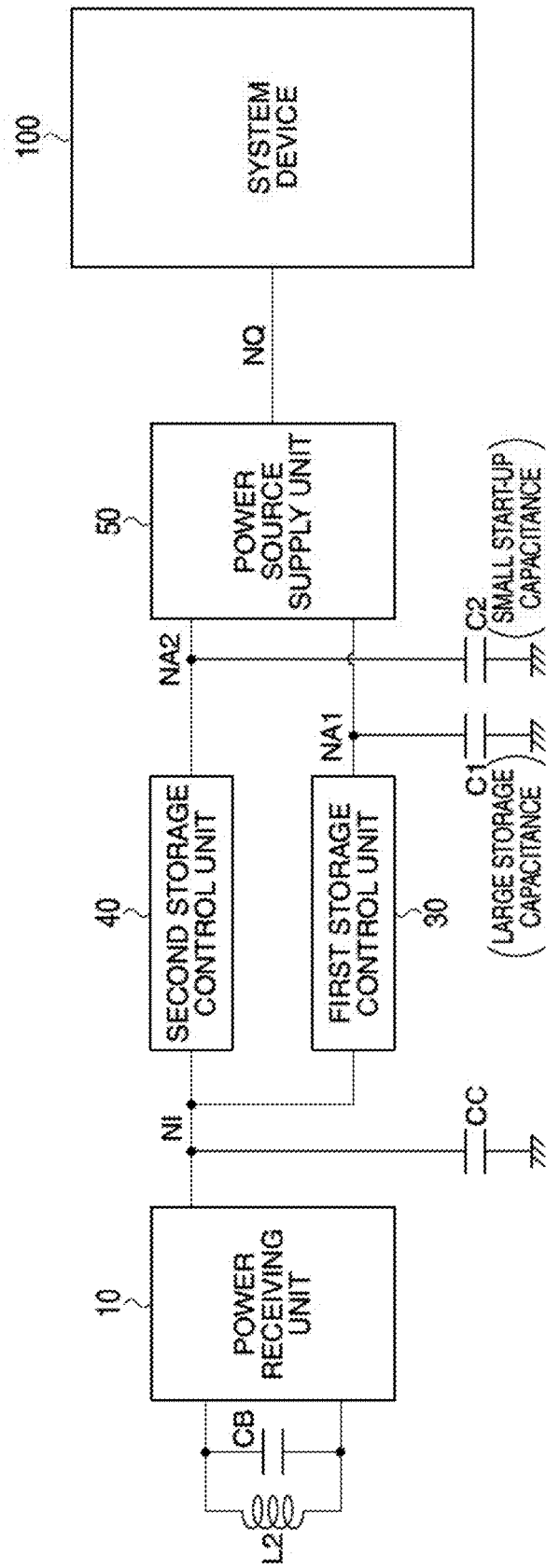
FIG. 1 is a basic configuration example of a circuit device of an embodiment.

FIG. 1 shows a basic configuration example of a circuit device of the embodiment. The circuit device includes a first storage control unit 30, a second storage control unit 40, and a power source supply unit 50. The configuration of the circuit device is not limited to that of FIG. 1. Various modifications such as omitting a portion of the components or adding another component can be implemented.

A power receiving unit 10 receives power from a power transmission device (the other side apparatus, a terminal device, or a charger) by electromagnetic induction. For example, the power receiving unit 10 receives power by non-contact power transmission (contactless power transmission) to enable power transmission without metal-to-metal contact.

The first storage control unit 30 (a first storage operation unit) receives power from the power receiving unit 10 which receives power by electromagnetic induction to perform control (operation) of storing charge in a storage capacitor C1 (a first charge storage unit in a broad sense). The second storage control unit 40 (a second storage operation unit) receives power from the power receiving unit 10 to perform control (operation) of storing charge in a start-up capacitor C2 (a second charge storage unit in a broad sense).

Specifically, the first storage control unit 30 is disposed between an input node NI of power from the power receiving unit 10 and a first storage node NA1. Then, the first storage control unit 30 controls a current or voltage for charging the storage main capacitor C1 to perform charge control on the capacitor C1.

For example, it is assumed that a system device 100 performs a display control process of an electrophoretic display unit (an EPD) which displays an image. In this case, the first storage control unit 30 performs control of storing charge necessary for at least one display rewriting of the electrophoretic display unit (a nonvolatile display element) in the capacitor C1. By doing this, it is possible to rewrite the display unit of the system device 100 at least only once after power reception by electromagnetic induction. With this configuration, when the embodiment is applied to, for example, an IC card for a prepaid card or electronic money, it is possible, after holding the IC card over a terminal device, to display the used amount, the remaining value, or the like on a display unit of the IC card.

The charge necessary for at least one display rewriting is charge necessary for rewriting image data corresponding to one screen when, for example, display rewriting of an image corresponding to one screen is performed after power reception. Alternatively, when display rewriting of an image of a portion of one screen is performed after power reception, the charge is a charge necessary for rewriting image data of the portion. These amounts of charge can be known in advance by the design or actual measurement. Accordingly, it is sufficient for, for example, the first storage control unit 30 to perform control of storing charge corresponding to worst-case data in the design value or measured value of the charge amount in the capacitor C1.

On the other hand, the second storage control unit 40 is disposed between the input node NI of power from the power receiving unit 10 and a second storage node NA2. Then, the second storage control unit 40 controls a current or voltage for charging the start-up sub capacitor C2 to perform charge control on the capacitor C2.

The power source supply unit 50 supplies power source due to power of electromagnetic induction to the system device 100. For example, the power source supply unit 50 supplies, based on the charges stored in the capacitors C1 and C2 (the first and second charge storage units), power source to the system device 100. Specifically, the power source supply unit 50 outputs power supply voltages based on voltages at the storage nodes NA1 and NA2 to an output node NQ of power source to the system device 100.

In this case, it is desirable that the power source supply unit 50 supplies power source to the system device 100 after a power supply voltage obtained by the stored charge of the capacitor C2 (the second charge storage unit) exceeds a minimum operating voltage of the system device 100. The minimum operating voltage is a voltage with which it is guaranteed that the system device 100 performs normal operation. For example, when the system device 100 is a microcomputer, the minimum operating voltage is defined by specifications and the like of the microcomputer. For example, when a power supply voltage lower than the minimum operating voltage is supplied to the system device 100, a trouble such as flowing of a shoot-through current into a transistor constituting the system device 100 may occur. In this regard, the power source supply unit 50 is configured so as not to supply power source to the system device 100 until a power supply voltage exceeds the minimum operating voltage, whereby the occurrence of such a trouble can be prevented.

The system device 100 (an object device to be supplied with power source) is a device serving as an object to be supplied with power source by electromagnetic induction. The system device 100 performs, for example, a display control process and the like of a display unit which displays an image. The system device 100 can be realized by, for example, a microcomputer or the like incorporating therein a display controller.

In the embodiment, the capacitor C2 (the second charge storage unit) is a system-start-up charge storage unit whose charge storage capacitance is smaller than that of the storage capacitor C1 (the first charge storage unit). As one example, the capacitance of the storage capacitor C1 is several tens μF to several hundreds μT (for example, about 100 μF), while the capacitance of the start-up capacitor C2 is 1 μF or less (for example, about 0.1 μF). As the capacitor C1 or the like serving as a storage element, a condenser such as a supercapacitor can be used. Accordingly, since a storage element can be configured to be of thin type, it is possible to easily incorporate into an IC card and the like.

One end of the capacitor C1 is connected to the storage node NA1 as an output node of the first storage control unit 30, and the other end is connected to a GND node, for example. Moreover, one end of the capacitor C2 is connected to the storage node NA2 as an output node of the second storage control unit 40, and the other end is connected to the GND node, for example. To the input node NI of power, one end of a potential stabilizing capacitor CC is connected.

Then, the power source supply unit 50 supplies, at the time of system start-up after the start of power reception by the power receiving unit 10, power source based on the stored charge of the capacitor C2 (the second charge storage unit) to the system device 100. That is, at the time of system start-up, the power source supply unit 50 supplies the power source based on the stored charge of the system-start-up capacitor C2 with a small capacitance (a power supply voltage based on a voltage at the node NA2) to the system device 100.

On the other hand, the power source supply unit 50 supplies, in a period after the end of power reception by the power receiving unit 10, power source based on the stored charge of the capacitor C1 (the first charge storage unit) to the system device 100. That is, in the period after the end of power reception where the system is started up and the capacitor is sufficiently charged, the power source supply unit 50 supplies the power source based on the stored charge of the storage capacitor C1 with a large capacitance (a power supply voltage based on a voltage at the node NA1) to the system device 100.

It is desirable that the power source to be supplied to the system device 100 in the period after the end of power reception is power source based on the stored charges of both of the capacitors C1 and C2. Moreover, it is sufficient that the power source based on the stored charge of the capacitor C2 is supplied to the system device 100 at the time of system start-up (the first half of a power reception period) in the power reception period. For example, in the second half of the power reception period, the power source based on the stored charge of the capacitor C1 may be supplied to the system device 100.

In the circuit device of the embodiment configured as described above, since the start-up capacitor C2 with a small capacitance is charged in a short time after the start of power reception by the power receiving unit 10, it is possible to rapidly supply a power supply voltage to the system device 100 to start up the system. Then, the storage capacitor C1 with a larger capacitance than that of the capacitor C2 is thereafter charged, so that it is possible, also after the end of the power reception period, to supply the power source to the system device 100 for operation based on the charge charged in the capacitor C1.

For example, when the circuit device of the embodiment is applied to a contactless IC card, it is necessary to communicate with a terminal device in a short time to store power. However, a capacitor in which power is stored has a large capacitance and the rise of its charging voltage is slow, so that there is a problem that the communication cannot be started because the reset of a system (a system device) is not cancelled.

In this regard, in the embodiment as shown in FIG. 1, the start-up capacitor C2 with a small capacitance is disposed in addition to the storage capacitor C1 with a large capacitance. With this configuration, immediately after the start of power reception, it is possible to operate the system device 100 with the charging voltage of the capacitor C2 to perform communication or the like. Accordingly, the system can be started up without depending on the capacitance of the storage capacitor C1, so that it is possible to promptly start up a communication system to shorten the power storing and communication times.

Figure 2:
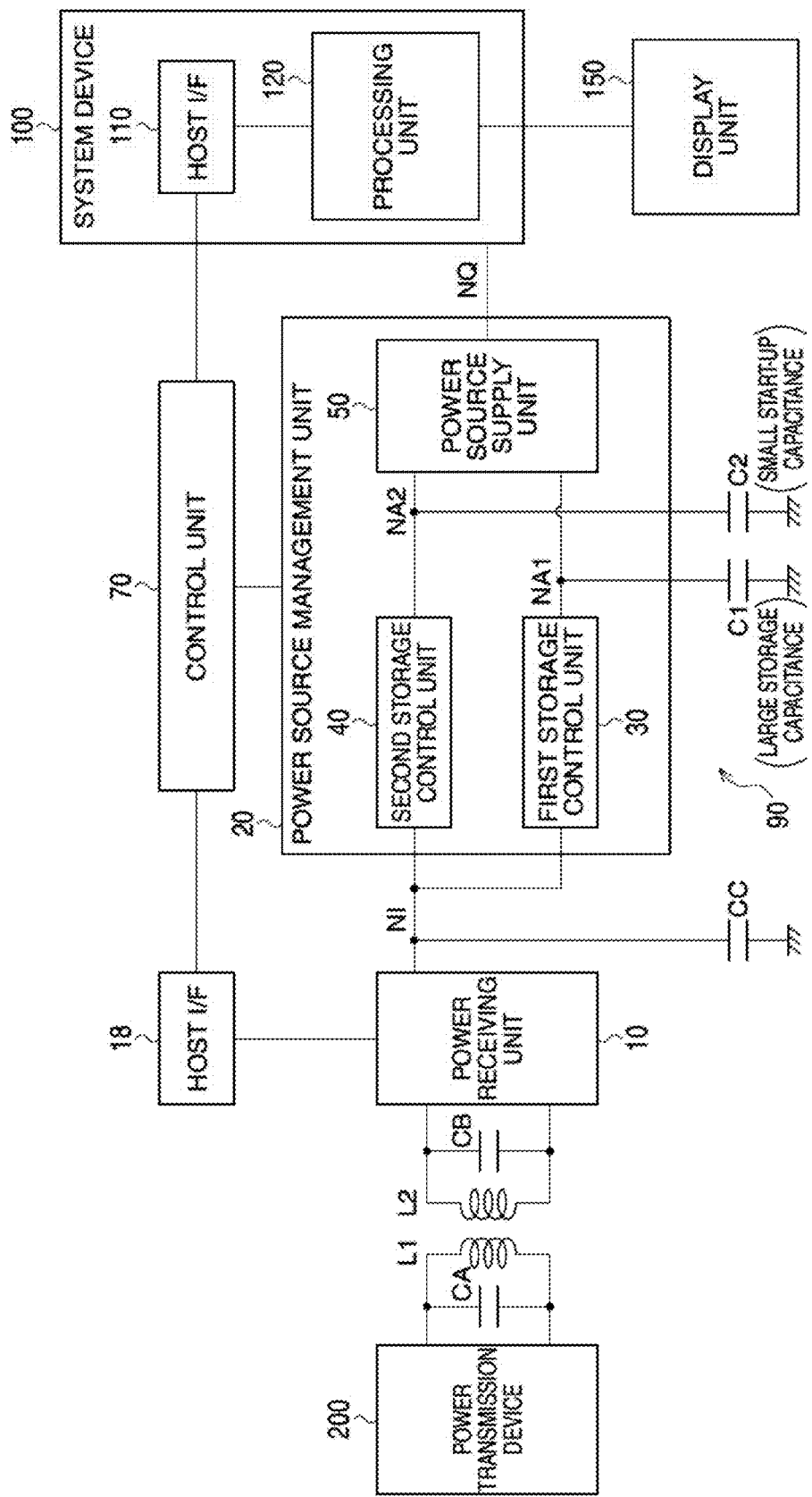
FIG. 2 is a configuration example of an electronic apparatus to which the circuit device of the embodiment is applied.

FIG. 2 shows a configuration example of an electronic apparatus to which the circuit device of the embodiment is applied. The electronic apparatus of FIG. 2 includes the power receiving unit 10 which receives power by electromagnetic induction, the circuit device 90 of the embodiment, the system device 100, and a display unit 150 (an electrophoretic display unit or the like). The circuit device 90 has a power source management unit 20 and a control unit 70. Moreover, the electronic apparatus can include a host I/F 18, a secondary coil L2 (a power receiving coil or a secondary inductor), a capacitor CB, and the capacitors C1 and C2. The secondary coil L2 and the capacitor CB constitute a resonant circuit on a power reception side.

The configuration of the electronic apparatus is not limited to that of FIG. 2. Various modifications such as omitting a portion of the components or adding another component can be implemented. Moreover, as an electronic apparatus to which the embodiment is applied, various apparatuses such as an IC card, an electronic shelf label, and an IC tag can be assumed.

The power receiving unit 10 receives, by electromagnetic induction, power transmitted from a power transmission device 200 (a terminal device, a charger, or the other side apparatus). Specifically, a primary coil L1 (a power transmitting coil, or a primary inductor) disposed on a power transmission side and the secondary coil L2 disposed on the power reception side are electromagnetically coupled to form a power transmission transformer, whereby contactless power transmission (non-contact power transmission) is realized. The power receiving unit 10 converts an alternating induced voltage of the secondary coil L2 into a direct-current voltage. This conversion can be realized by a rectifier circuit or the like included in the power receiving unit 10.

As the primary coil L1 and the secondary coil L2, a planar coil or the like, for example, can be adopted. However, the embodiment is not limited to this, and those having any shape and configuration are available as long as the primary coil L1 and the secondary coil L2 can be electromagnetically coupled to transmit power.

The host I/F (interface) 18 is an interface for communication with the power transmission device 200 as the other side apparatus. This data communication may be realized using the primary coil L1 and the secondary coil L2 for electromagnetic induction, or may be realized by disposing another coil for communication.

The power source management unit 20 includes the first and second storage control units 30 and 40 and the power source supply unit 50 described with reference to FIG. 1. The power source management unit 20 can be realized by an analog circuit or a digital circuit.

The control unit 70 performs various controls for the circuit device 90 of the embodiment or performs a communication control process. The control unit 70 can be realized by a digital circuit such as a gate array circuit.

The system device 100 is a device which executes processes as a system of the electronic apparatus and can be realized by, for example, a microcomputer or the like. The system device 100 includes a host I/F 110 and a processing unit 120.

The display unit 150 displays various images. The processing unit 120 (a processor) performs a display control process of the display unit 150. As the display unit 150, an electrophoretic display unit (hereinafter appropriately referred to as "EPD") or the like, for example, can be adopted, and the processing unit 120 performs the display control process of the EPD. Moreover, the processing unit 120 performs various control processes necessary for the operation of the system.

As display information of the display unit 150, information of received data through communication, sensor detected information (information such as pressure, temperature, or humidity), unique information and individual information of a memory incorporated into an IC card, and the like can be considered.

The host I/F 110 is communicatively connected with the host I/F 18 on the power receiving unit 10 side via, for example, the control unit 70. With this configuration, the system device 100 can perform data communication with the power transmission device 200.

Figure 3:
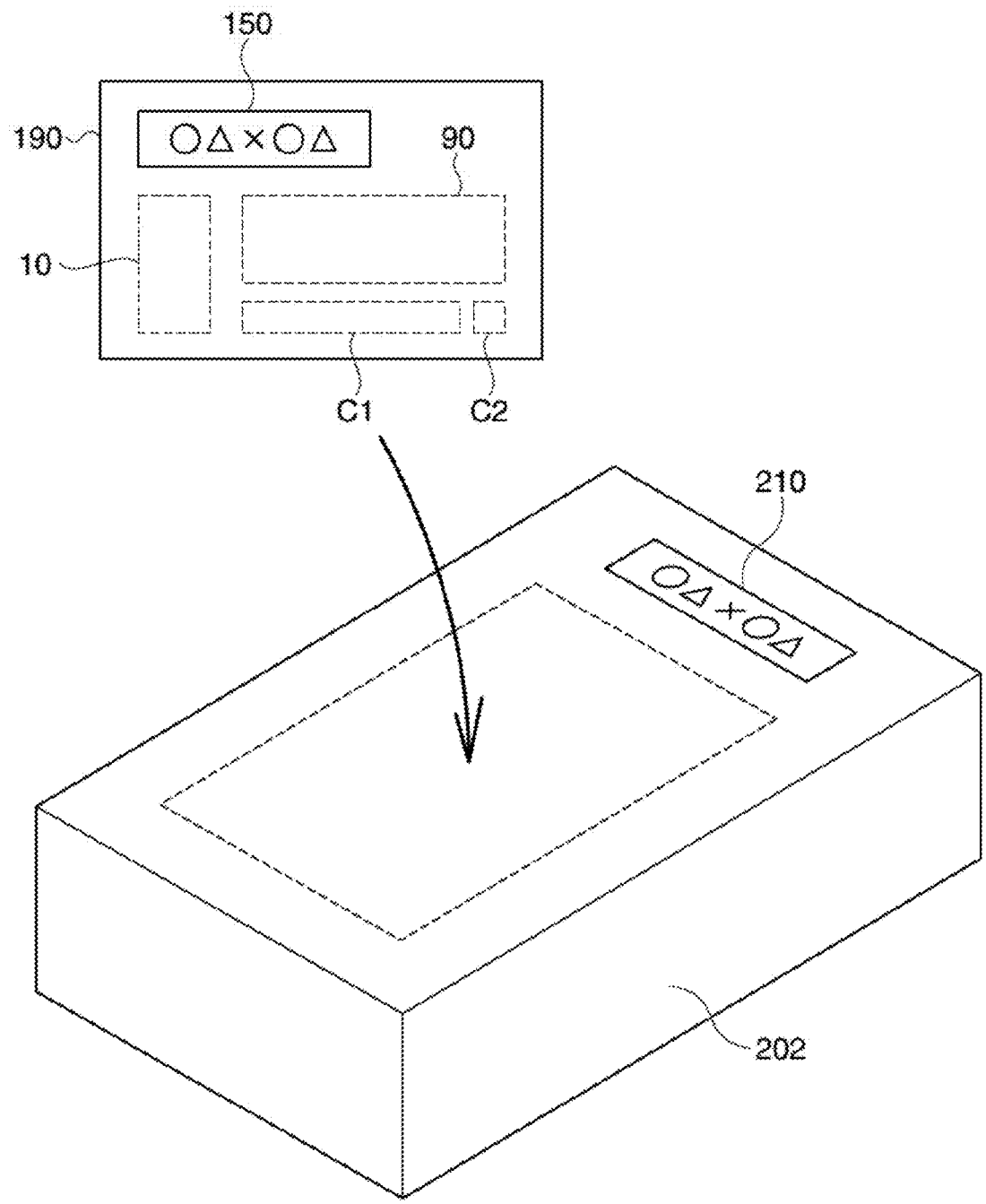
FIG. 3 is an example of being applied to a contactless IC card as one of electronic apparatuses.

FIG. 3 is an application example when the electronic apparatus is an IC card 190. In the IC card 190, the display unit 150 realized by an EPD or the like is disposed, so that various information can be displayed. Moreover, the power receiving unit 10, the circuit device 90 (an IC), the capacitors C1 and C2, and the like are mounted in the interior of the IC card 190.

When a user holds the IC card 190 over a terminal device 202 (a power transmission device), the IC card 190 receives power from the terminal device 202 by electromagnetic induction to operate, and performs data communication with the terminal device 202. Then, an image such as numbers or characters corresponding to the communication result is displayed on the display unit 150. Taking electronic money or a prepaid card as an example, the used amount, the remaining value, or the like is displayed on the display unit 150. Moreover, various information is displayed on a display unit 210 of the terminal device 202.

Since the EPD as a nonvolatile display element can retain display information in the unpowered state, the EPD is a display device suitable as the display unit 150 of the IC card 190 shown in FIG. 3.

However, the EPD has a drawback that it requires a long time (for example, 1 sec) to rewrite display information compared to a liquid crystal display device. Because of this, there is a problem that it is hard to perform display rewriting of the EPD by receiving power through "touch and go" operation which is performed by holding the IC card 190 over the terminal device 202 as shown in FIG. 3.

Figure 4A:
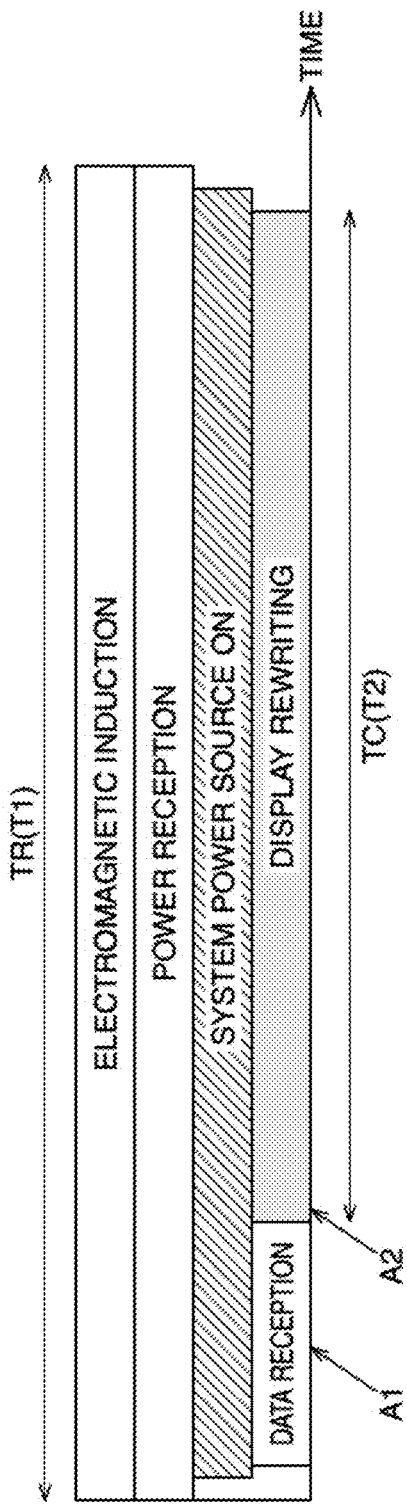
FIG. 4A is an explanatory view of a method of a comparative example.

For example, in a method of a comparative example of FIG. 4A, a length T1 of a power reception period TR by electromagnetic induction is lengthened, and data reception from the terminal device 202 is performed in the first half of the power reception period TR as shown by A1. Then, in a display rewriting period TC as the second half of the power reception period TR as shown by A2, display rewriting of the EPD is performed. In this case, a length T2 of the display rewriting period TC becomes shorter than the length T1 of the power reception period TR.

However, in the method of the comparative example of FIG. 4A, since the length T1 of the power reception period TR is long, the "touch and go" operation (operation whose time length is, for example, about 0.1 sec) shown in FIG. 3 cannot be realized.

Figure 4B:
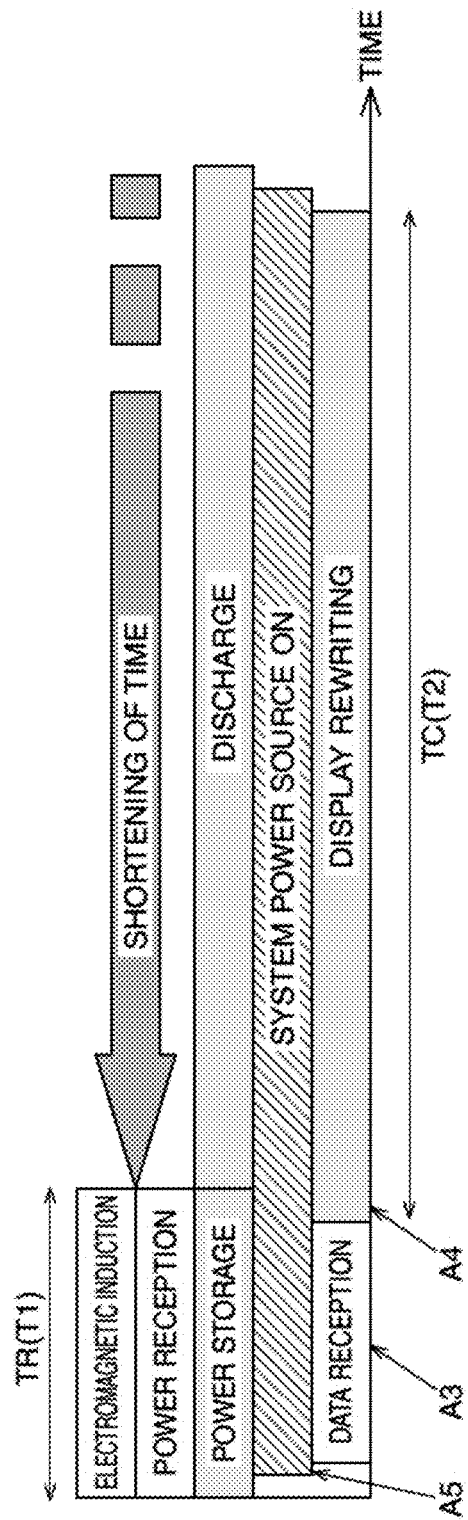
FIG. 4B is an explanatory view of a method of the embodiment.

Therefore, in the embodiment as shown in FIG. 4B, the length T1 of the power reception period TR is shortened. Then, data reception from the terminal device 202 is performed during the power reception period TR as shown by A3, and in the subsequent display rewriting period TC as shown by A4, display rewriting of the EPD is performed. In this case, when the length of the power reception period TR is defined as T1 and the length of the display rewriting period TC is defined as T2, they are set such that the relationship of T2>T1 is satisfied.

In this manner, by shortening the length T1 of the power reception period TR, the IC card 190 can receive power to operate by the "touch and go" operation shown in FIG. 3. Moreover, by lengthening the length T2 of the display rewriting period TC, rewriting of display information is possible even when the EPD is utilized as the display unit 150. That is, although the EPD requires a long time (1 sec) to rewrite display information compared to a liquid crystal display device, at least one display rewriting of the EPD is possible by lengthening T2.

In this case, if the length T1 of the power reception period TR is short, sufficient charge necessary for display rewriting of the EPD may not be stored.

Therefore, in FIGS. 1 and 2, a capacitor with a large capacitance is disposed as the storage capacitor C1. For example, by using a condenser such as a supercapacitor as the capacitor C1, sufficient charge necessary for display rewriting of the EPD can be stored.

Specifically, the first storage control unit 30 performs control of storing charge necessary for at least one display rewriting of the EPD (the electrophoretic display unit) in the capacitor C1 (the charge storage unit).

Then, the system device 100 is supplied with power source based on the charge stored in the capacitor C1 (the charge storage unit) in the power reception period TR of the power receiving unit 10, and performs the display rewriting process of the EPD in the display rewriting period TC after power reception. For example, the system device 100 performs the display rewriting process of the EPD based on data received from the terminal device 202 in the power reception period TR. In this case, as described above, the relationship of T2>T1 is satisfied between the length T1 of the power reception period TR and the length T2 of the display rewriting period TC.

That is, in the embodiment as shown in FIG. 4B, charge is stored in the storage capacitor C1 with a large capacitance in the power reception period TR which is short, and in the subsequent display rewriting period TC which is long, the rewriting process of display information of the EPD is performed.

By doing this, the EPD which can retain display information in the unpowered state can be incorporated into an IC card for which the "touch and go" operation is required, so that an IC card capable of displaying various information by the EPD can be realized.

In this case, when the power reception period TR is shortened as shown in FIG. 4B, it becomes hard to operate the system device 100 over the subsequent long display rewriting period TC.

In this regard, in the embodiment, the storage capacitor C1 with a large capacitance is disposed, and charge control in the first storage control unit 30 is devised. Therefore, even in the short power reception period TR, the embodiment has succeeded in storing sufficient charge necessary for operating the system device 100 over the long display rewriting period TC. Especially by limiting charge to be stored in the storage capacitor C1 to the charge amount necessary for, for example, one display rewriting of the EPD, it is possible to operate the system device 100 over the long display rewriting period TC to perform the display rewriting of the EPD even when the power reception period TR is shortened.

However, when the capacitance of the storage capacitor C1 is made large in this manner, a power supply voltage to be supplied to the system device 100 is hard to rise, resulting in a problem that prompt start-up of the system is impossible.

Therefore, in the embodiment, the start-up capacitor C2 is disposed separately from the storage capacitor C1. As shown by B1 and B2 of FIG. 5A, these capacitors C1 and C2 are charged, based on an output voltage from the power receiving unit 10, via the first and second storage control units 30 and 40.

Then, as shown by B3 of FIG. 5A, at the time of system start-up after the start of power reception by the power receiving unit 10, the power source based on the stored charge of the start-up capacitor C2 is supplied to the system device 100. That is, since the capacitance of the start-up capacitor C2 is small, the rise of a voltage at the charge storage node NA2 of C2 is fast, and this voltage is supplied to the system device 100 as a power supply voltage as shown by B3.

On the other hand, as shown in FIG. 5B, in the period after the end of power reception by the power receiving unit 10, the power source based on the stored charge of the storage capacitor C1 is supplied to the system device 100. That is, since the capacitance of the storage capacitor C1 is large, the rise of a voltage at the charge storage node NA1 of C1 is slow. However, when time has elapsed after the start of power reception, this voltage exceeds the minimum operating voltage of the system device 100, so that the voltage can be supplied to the system device 100 as a power supply voltage as shown by B4.

By doing this, it is possible to promptly turn on a system power source as shown by A5 of FIG. 4B to operate the system device 100. With this configuration, it is possible to promptly complete a data reception process shown by A3, so that it becomes possible to respond to a short power reception period which realizes the "touch and go" operation.

That is, for realizing the "touch and go" operation, it is necessary to complete data reception between the IC card 190 and the terminal device 202 during a short power reception period. However, when the rise of a power supply voltage becomes slow because of the use of the capacitor C1 with a large capacitance to thereby delay the start-up of the system, the start of data reception is delayed even by that delay. Therefore, the system device 100 cannot complete the data reception process during the short power reception period.

In this regard, in the embodiment, since the system device 100 promptly starts up with the power source based on the start-up capacitor C2 with a small capacitance to operate, the system device 100 can complete the data reception process even in the short power reception period, so that it becomes possible to respond to the "touch and go" operation of the IC card 190. As described above, the power source supplying method of the embodiment is a method suitable for a contact-less IC card or the like which includes a display unit of an EPD and requires the "touch and go" operation.

2. Detailed Configuration Examples of Circuit Device

Figure 6:
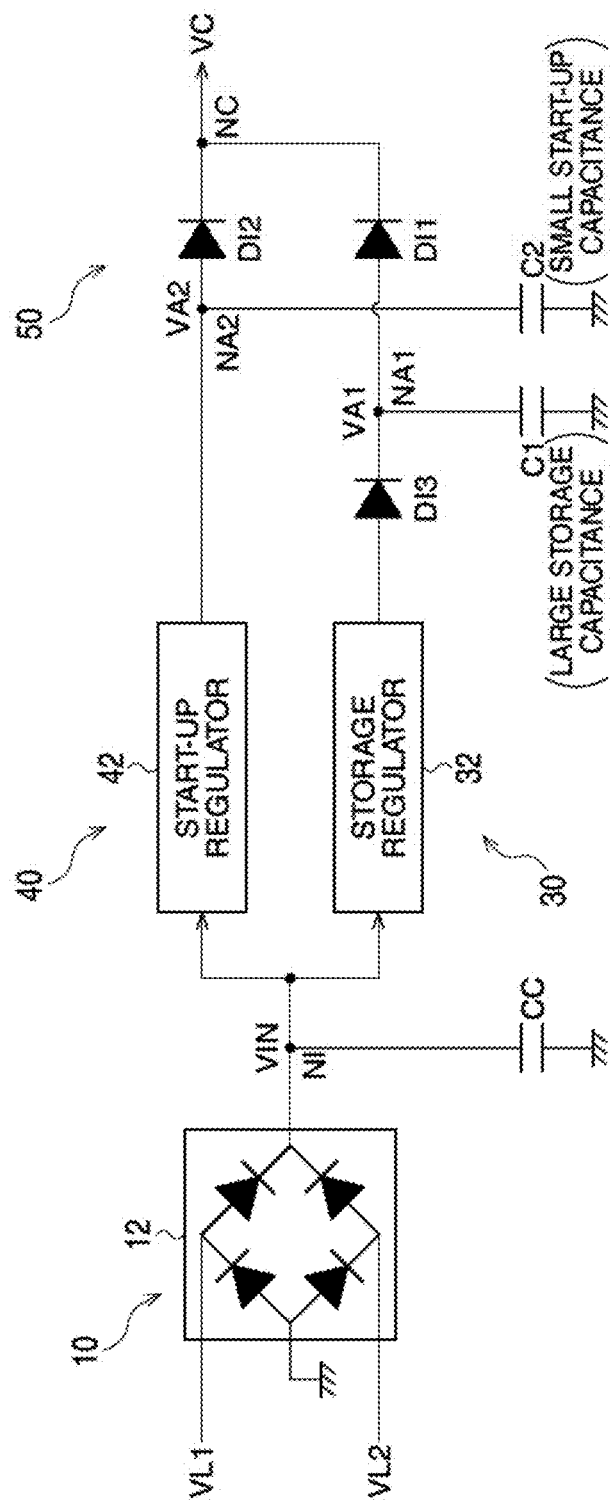
FIG. 6 is a detailed first configuration example of the circuit device of the embodiment.

Next, detailed configuration examples of the circuit device of the embodiment will be described. FIG. 6 is a detailed first configuration example of the circuit device.

In FIG. 6, the first storage control unit 30 of FIGS. 1 and 2 is realized by a storage regulator 32, and the second storage control unit 40 is realized by a start-up regulator 42.

Then, the storage regulator 32 receives a voltage VIN from a rectifier circuit 12 constituting the power receiving unit 10 and outputs a voltage VA1 after voltage regulation to the storage node NA1 via a backflow preventing diode 13. For example, the storage regulator 32 outputs the constant voltage VA1 through the voltage regulation. Specifically, a voltage of up to about 15V, for example, is stepped down to the constant voltage VA1 of about 4.5 V, for example, by the regulator 32 to perform charge storage to the storage capacitor C1.

Moreover, the start-up regulator 42 receives the voltage VIN from the rectifier circuit 12 and outputs a voltage VA2 after voltage regulation to the storage node NA2. For example, the start-up regulator 42 outputs the constant voltage VA2 through the voltage regulation. Specifically, a voltage of up to about 15V, for example, is stepped down to the constant voltage VA2 of about 4.5 V, for example, by the regulator 42 to perform charge storage to the start-up capacitor C2.

The configurations of the first and second storage control units 30 and 40 are not limited to the regulators 32 and 42 which perform the voltage regulation shown in FIG. 6, but may be, for example, a circuit which monitors voltages at the storage nodes NA1 and NA2 or the like to perform current regulation.

In FIG. 6, the power source supply unit 50 includes first and second diodes DI1 and DI2. The DI1 is disposed between the storage node NA1 of the storage regulator 32 (the first charge storage unit 30) and a connection node NC. The DI1 is a diode whose forward direction is a direction from the storage node NA1 toward the connection node NC. The DI2 is disposed between the storage node NA2 of the start-up regulator 42 (the second charge storage unit 40) and the connection node NC. The DI2 is a diode whose forward direction is a direction from the storage node NA2 toward the connection node NC. Then, the power source supply unit 50 supplies, based on a voltage at the connection node NC, power source to the system device 100.

By configuring the power source supply unit 50 with the diodes DI1 and DI2 described above, backflow of current from the connection node NC to the storage nodes NA1 and NA2 can be prevented, and the voltages VA1 and VA2 at the storage nodes NA1 and NA2 can be output as a power supply voltage VC to the connection node NC.

Figure 7A:
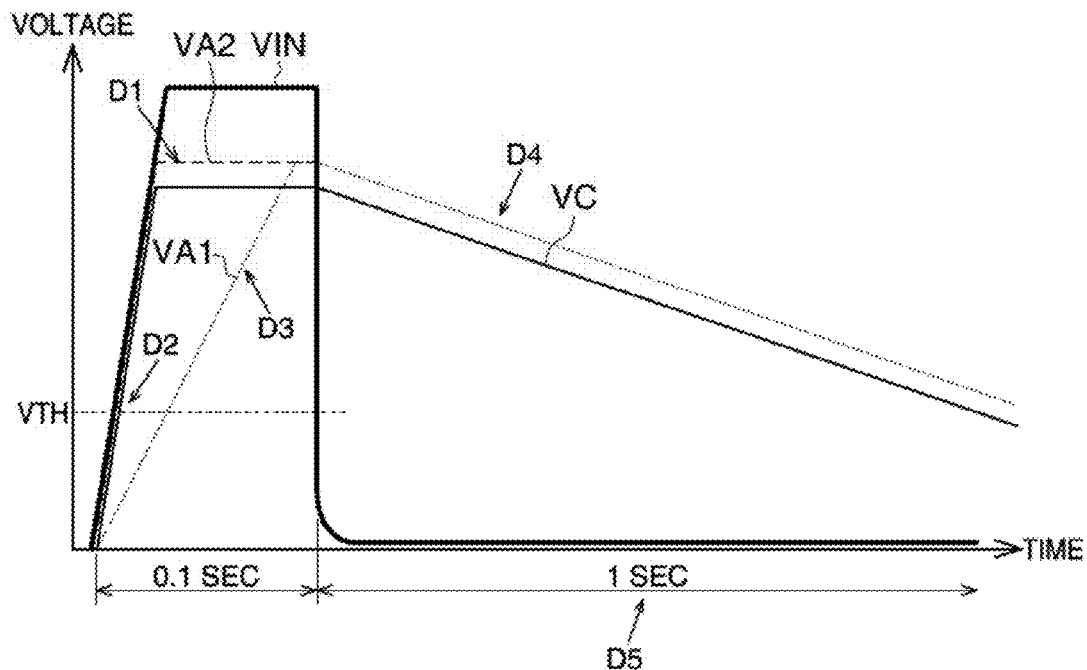
FIGS. 7A and 7B are operational explanatory views of the first configuration example.

FIG. 7A is a voltage waveform diagram for explaining operation of the circuit device of FIG. 6.

When power reception is started and the voltage VIN from the power receiving unit 10 is supplied, the voltage VA2 at the storage node NA2 of the capacitor C2 promptly rises as shown by D1 because the capacitance of the start-up capacitor C2 is small. Then, as will be described in detail later, when the voltage VA2 exceeds a threshold voltage VTH corresponding to the minimum operating voltage of the system device 100 as shown by D2, a voltage corresponding to the voltage VA2 is supplied as the power supply voltage VC to the system device 100. Specifically, a voltage dropped from VA2 by an amount corresponding to a forward voltage of the diode DI2 is supplied as VC.

On the other hand, since the capacitance of the storage capacitor C1 is large, the voltage VA1 at the storage node NA1 of the capacitor C1 gradually rises as shown by D3. Then, when the voltage VA1 rises, a voltage corresponding to the voltage VA1 is supplied as the power supply voltage VC to the system device 100. Specifically, a voltage dropped from VA1 by an amount corresponding to a forward voltage of the diode DI1 is supplied as VC.

When the power reception period ends after the start of power reception, the charges of the capacitors C1 and C2 are discharged, and therefore the power supply voltage VC is gradually decreased as shown by D4. In the embodiment in this case, since the capacitance of the capacitor C1 is sufficiently large, it is possible to assure a display rewriting period of a long time (for example, 1 sec) as shown by A4 of FIG. 4B or D5 of FIG. 7A.

Figure 7B:
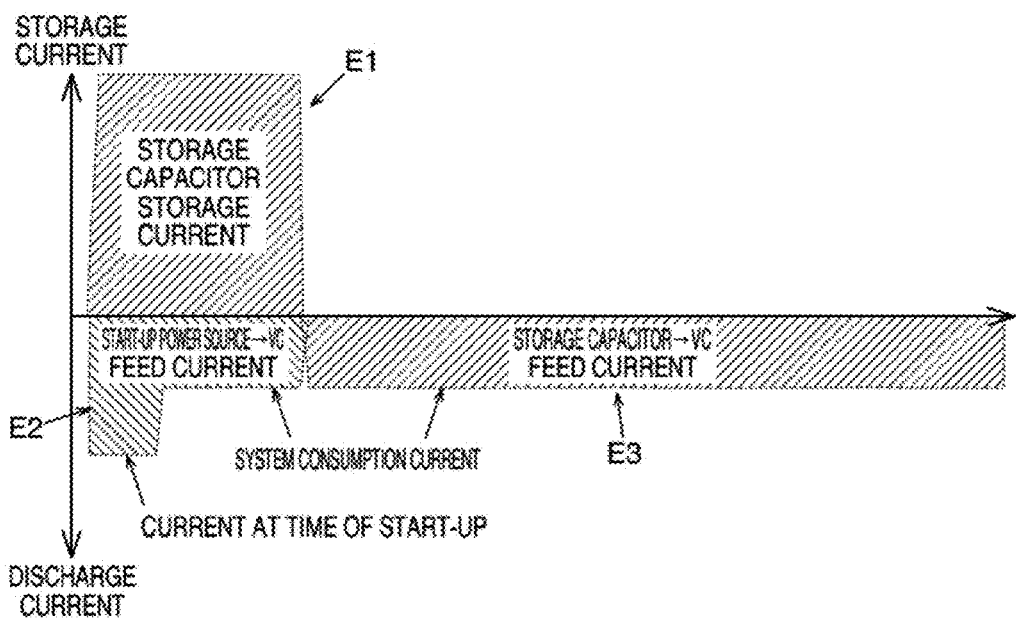

FIG. 7B shows a relationship between a storage current and a discharge current. For example, in the power reception period, charge is stored in the capacitor as shown by E1. Moreover, the charge is discharged from the capacitor for the system start-up or the like as shown by E2. Then, in the display rewriting period, the charge is discharged from the capacitor as shown by E3, and the display rewriting process of the EPD is performed by the system device 100 based on this discharged charge.

The configuration of the circuit device of the embodiment is not limited to that of FIG. 6, but various modification can be implemented. For example, FIG. 8 shows a detailed second configuration example of the circuit device.

Figure 8:
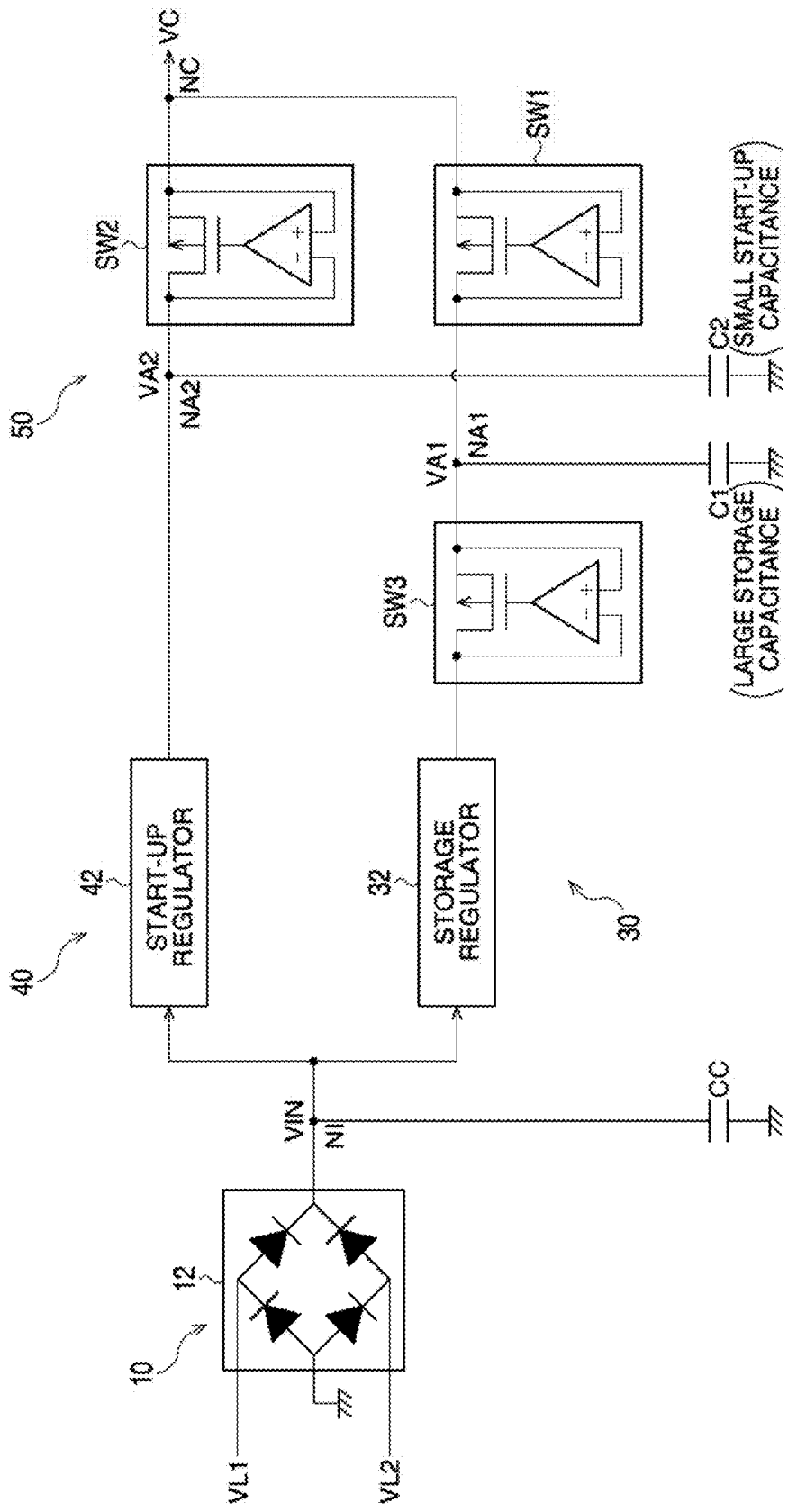
FIG. 8 is a detailed second configuration example of the circuit device of the embodiment.

In the second configuration example of FIG. 8, switch/transistor circuits SW1, SW2, and SW3 are disposed instead of the diodes DI1, DI2, and D13 of FIG. 6.

According to the second configuration example of FIG. 8, since voltage drop due to the forward voltage of the diode does not occur, there is an advantage that power source supplying efficiency can be improved even by that amount.

On the other hand, in the first configuration example of FIG. 6, since voltage switching operation is realized by the diodes DI1 and DI2, there is an advantage that a control signal for switching operation is not necessary. For example, before the system start-up, a situation where it is hard to generate such a control signal is created. However, according to the first configuration example of FIG. 6, it becomes possible to respond to such a situation.

Figure 9:
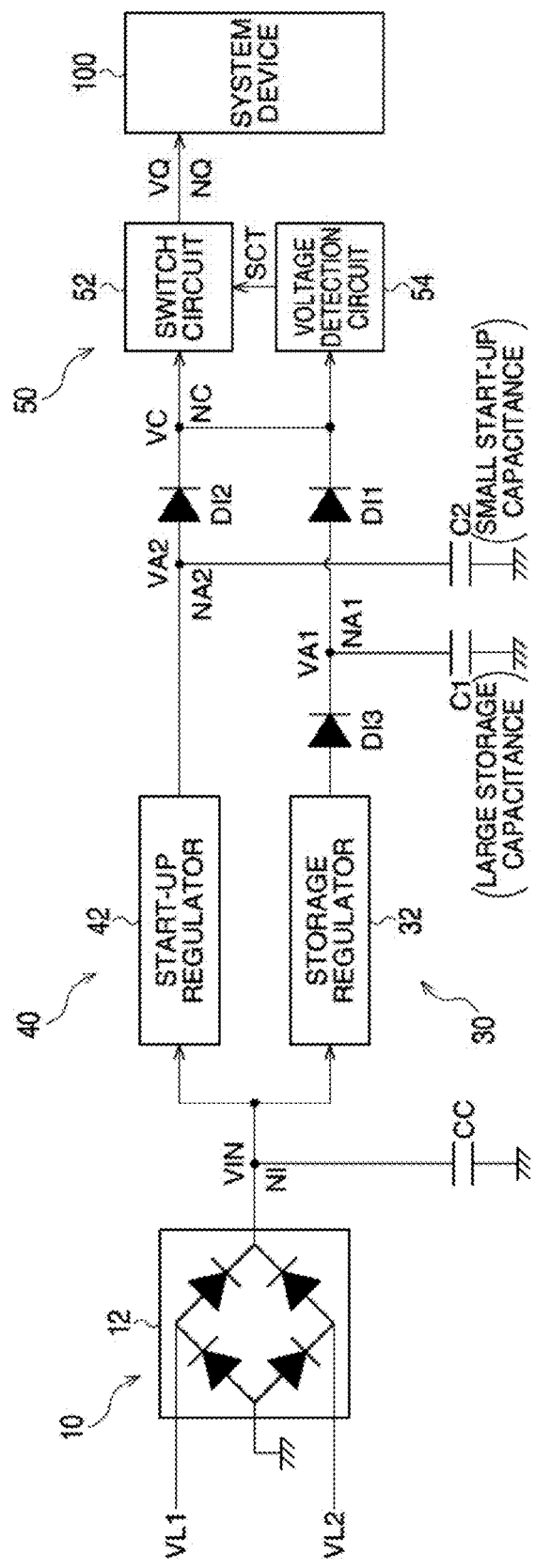
FIG. 9 is a detailed third configuration example of the circuit device of the embodiment.

FIG. 9 shows a detailed third configuration example of the circuit device. In FIG. 9, the power source supply unit 50 further includes a switch circuit 52 and a voltage detection circuit 54.

The switch circuit 52 is disposed between the connection node NC of the diodes DI1 and DI2 and the output node NQ of the power source supply unit 50. The voltage detection circuit 54 detects the voltage VC at the connection node NC. Then, when the voltage detection circuit 54 detects that the voltage VC at the connection node NC has exceeded the given threshold voltage VTH, the switch circuit 52 is brought into ON state (conduction state) to supply power source to the system device 100. For example, when the voltage VC exceeds the threshold voltage VTH as shown by D2 of FIG. 7A, the voltage detection circuit 54 makes a signal SCT active, whereby the switch circuit 52 is brought into ON state to supply the voltage VC as a power supply voltage VQ to the system device 100.

By doing this, such power source control becomes possible that, for example, after exceeding the minimum operating voltage of the system device 100, the power supply voltage VQ is supplied to the system device 100. With this configuration, it is possible to effectively prevent such a case that a power supply voltage equal to or less than the minimum operating voltage is supplied to the system device 100 to generate a shoot-through current or the like to result in unstable operation.

3. System Device

Figure 10:
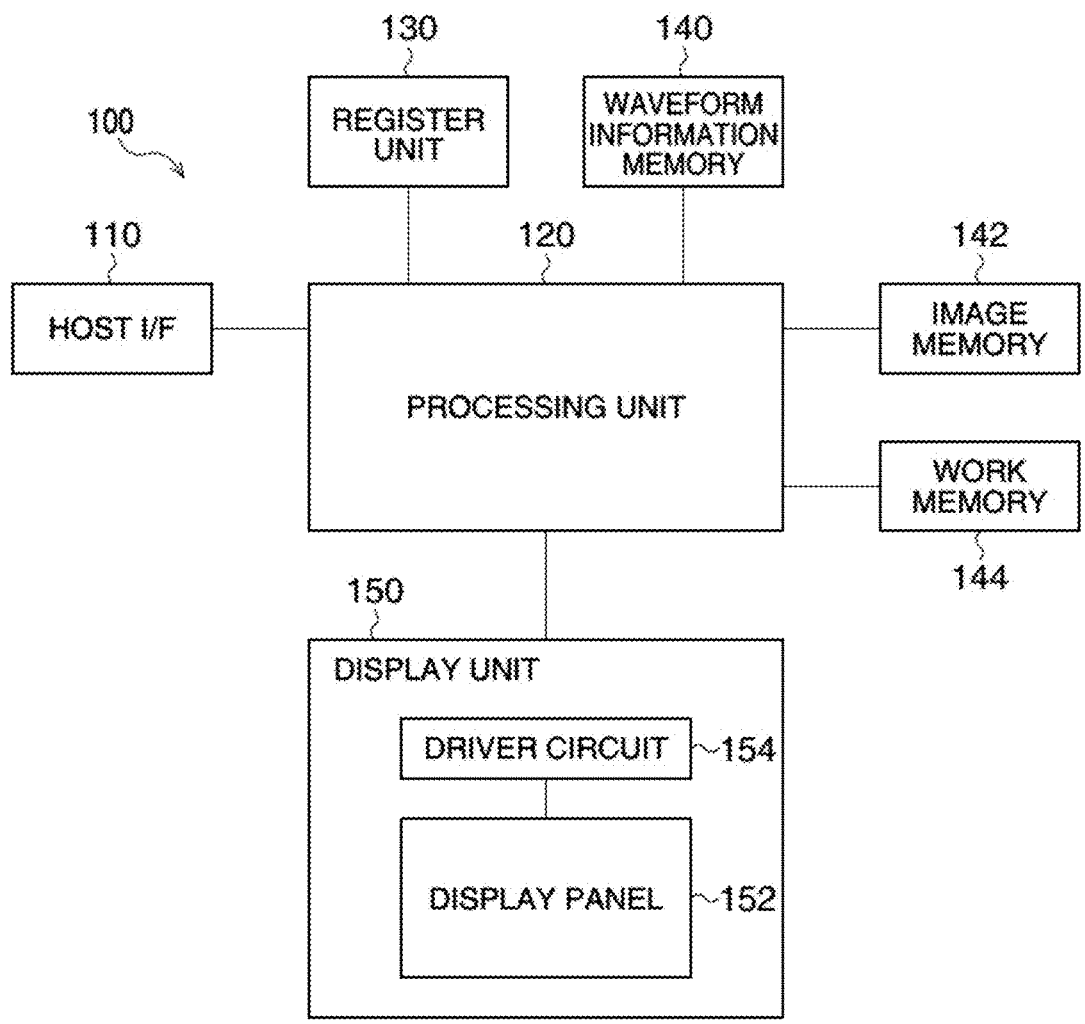
FIG. 10 is a configuration example of a system device.

Next, a configuration example of the system device 100 will be described. FIG. 10 shows a detailed configuration example of the system device 100. The system device 100 includes the host I/F 110, the processing unit 120, a register unit 130, a waveform information memory 140, an image memory 142, and a work memory 144. The configuration of the system device 100 is not limited to that of FIG. 10. Various modifications such as omitting a portion of the components or adding another component can be implemented. For example, the memories 140, 142, and 144 each may be an external memory.

The host I/F 110 is an interface for performing the transmission and reception of information with the other side apparatus (a power transmission device, a terminal device, or a charger) serving as a host. The host I/F 110 is connected to the host I/F 18 on the power receiving unit 10 side via the control unit 70 as shown in FIG. 2. With this configuration, it is possible to transmit and receive information to and from the power transmission device 200 (the other side apparatus). This transmission and reception of information can be realized by, for example, an amplitude modulation process (frequency modulation process) or load modulation process using the coils L1 and L2.

The processing unit 120 performs a display control process of the display unit 150 or various control processes for the system. The processing unit 120 can be realized by, for example, a processor, a gate array circuit, or the like.

The display unit 150 whose display is controlled by the processing unit 120 has a display panel 152 (an electro-optical panel) and a driver circuit 154 which is a circuit to drive the display panel 152. The driver circuit 154 drives data lines (segment electrodes) or scanning lines (common electrodes) of the display panel 152. The display panel 152 is realized by, for example, a display element such as an electrophoretic element.

The register unit 130 has various registers such as a control register or a status register. The register unit 130 can be realized by a RAM such as an SRAM, a flip-flop circuit, or the like.

The waveform information memory 140 stores waveform information, instruction code information, and the like for driving the EPD. The waveform information memory 140 can be realized by, for example, a nonvolatile memory (for example, a flash memory) or the like capable of rewriting and erasing data.

The image memory 142 (a VRAM) stores image data corresponding to, for example, one screen displayed on the display panel 152. The work memory 144 is a memory serving as a work area of the processing unit 120 or the like. The image memory 142 and the work memory 144 can be realized by a RAM such as an SRAM.

Figure 11A:
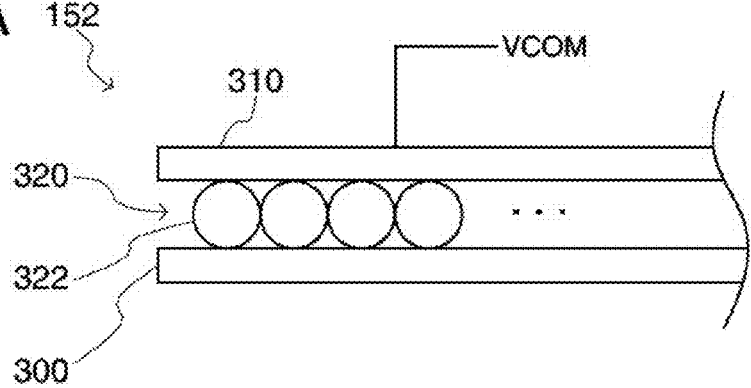
FIGS. 11A to 11C are explanatory views of an electrophoretic-type display unit.

FIG. 11A shows a configuration example of the display panel 152. The display panel 152 includes an element substrate 300, a counter substrate 310, and an electrophoretic layer 320 disposed between the element substrate 300 and the counter substrate 310. The electrophoretic layer 320 (an electrophoretic sheet) is composed of numerous microcapsules 322 including electrophoretic materials. The microcapsule 322 is realized by, for example, dispersing positively charged black particles (electrophoretic materials) and negatively charged white particles (electrophoretic materials) into a dispersion liquid and encapsulating the dispersion liquid in a fine capsule.

The element substrate 300 is formed of glass or a transparent resin. On the element substrate 300, a plurality of data lines (segment electrodes), a plurality of scanning lines (common electrodes), and a plurality of pixel electrodes each of which is disposed at a position of intersection of the data line and the scanning line are formed. Moreover, a plurality of switch elements each of which is formed of a TFT (a thin film transistor) or the like and connected to the pixel electrode are disposed. Moreover, a data driver which drives the data lines and a scanning driver which drives the scanning lines are disposed.

On the counter substrate 310, a common electrode (a transparent electrode) is formed. A common voltage VCOM (a counter voltage) is supplied to the common electrode. The electrophoretic sheet may be formed by forming a common electrode with a transparent conductive material in a transparent resin layer and applying adhesive or the like on the transparent resin layer to adhere an electrophoretic layer.

In the display panel 152 of FIG. 11A, when an electric field is applied between the pixel electrode and the common electrode, electrostatic forces in directions corresponding to the positive and negative charges act on the positively charged particles (black) and negatively charged particles (white) encapsulated in the microcapsule 322. For example, since the positively charged particles (black) above the pixel electrode at a higher potential than the common electrode move to the common electrode side, the pixel displays black.

Next, waveform information stored in the waveform information memory 140 of FIG. 10 will be described. The description will be made taking waveform information of the EPD (the electrophoretic display unit) as an example.

Figure 11B:
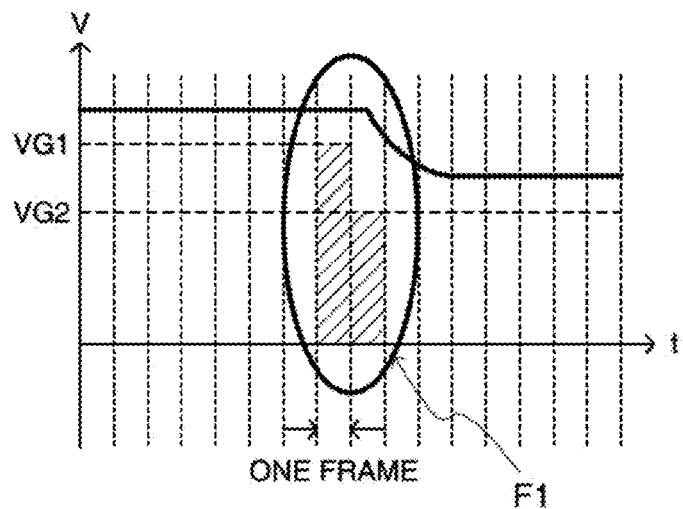

For example, in a liquid crystal display device as shown by F1 of FIG. 11B, when the gray scale of a pixel is changed from a first gray scale to a second gray scale, the data voltage of a data line (source line) also changes from a data voltage VG1 corresponding to the first gray scale to a data voltage VG2 corresponding to the second gray scale in one frame period.

Figure 11C:
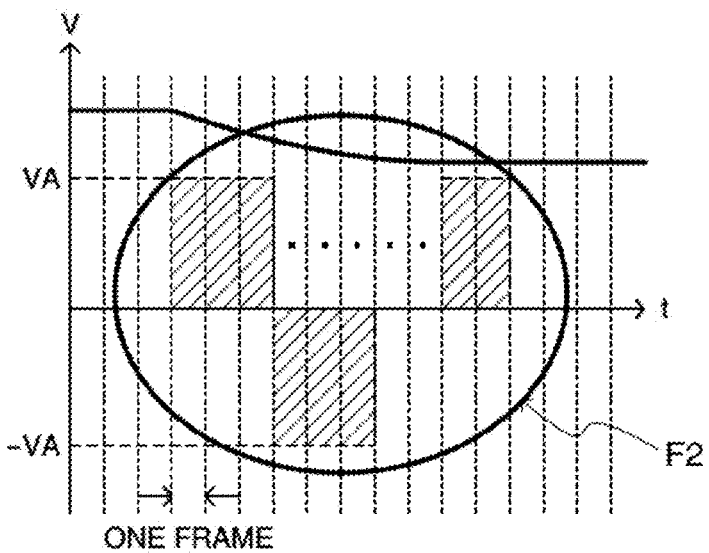

On the other hand, in the EPD as shown by F2 of FIG. 11C, when the gray scale of a pixel is changed from the first gray scale to the second gray scale, the data voltage of a data line changes over a plurality of frames. For example, when the first gray scale close to white is changed to the second gray scale close to black, white and black displays are repeated over a plurality of frames to finally change the gray scale of the pixel to the second gray scale. For example, in the waveform of FIG. 11C, the data voltage changes over a plurality of frames such that the data voltage is set to VA in the first three frames and then set to −VA in the next three frames. The waveform varies in form depending also on the combination of the gray scale of a pixel in the current display state and the gray scale of the pixel in the next display state.

The waveform information memory 140 stores the waveform information shown by F2 of FIG. 11C. The processing unit 120 determines, based on image data (gray scale data of each pixel) stored in the image memory 142 and waveform information stored in the waveform information memory 140, a drive voltage of the EPD in each frame to perform the display control process of the EPD (the display unit 150).

Then, as will be apparent from comparison between F1 of FIG. 11B and F2 of FIG. 11C, a long time is required for rewriting display information in the EPD compared to a liquid crystal display device or the like. Because of this, there is a problem that it is necessary to lengthen the length T2 of the display rewriting period TC of FIG. 4B.

In this regard, in the embodiment as described above, the storage capacitor C1 with a large capacitance is disposed to store charge necessary for at least one display rewriting of the EPD in the capacitor C1 during the power reception period TR.

Moreover, by disposing the start-up capacitor C2 with a small capacitance, the power source of the system is promptly turned on as shown by A5 of FIG. 4B. With this configuration, the processing unit 120 of FIG. 10 receives data such as display information from the other side apparatus (a power transmission device or a terminal device) as a host via the host I/F 110 as shown by A3.

Then, the processing unit 120 performs, in the display rewriting period TC after power reception, the display rewriting process of the EPD as shown by A4 of FIG. 4B. That is, the processing unit 120 performs, based on the display information received via the host I/F 110 and written in the image memory 142 and the waveform information stored in the waveform information memory 140, the display rewriting process of the EPD with the waveform shown by F2 of FIG. 11C.

By doing this, even in the EPD whose display rewriting period is long, rewriting of display information can be executed based on charge received in the short power reception period TR. Accordingly, it is possible to incorporate the display unit 150 of an EPD which can retain display information in the unpowered state into, for example, a contactless IC card for which the "touch and go" operation shown in FIG. 3 is required, so that it is possible to realize an unprecedented type of IC card.

While the embodiment has been described above in detail, those skilled in the art should readily understand that many modifications can be made without departing in substance from the novel matter and effects of the invention. Accordingly, all of those modified examples are deemed to be included in the scope of the invention. For example, in the specification or the drawings, the terms (the storage capacitor, the start-up capacitor, and the like) mentioned at least once together with different terms (the first charge storage unit, the second charge storage unit, and the like) in a broader sense or a similar sense may be replaced with the different terms in any part of the specification or the drawings. Moreover, all combinations of the embodiment and modified examples are also included in the scope of the invention. Moreover, the configurations and operation of the circuit device, the electronic apparatus, and the IC card, the charge storing method, the power source supplying method, and the like are not limited to those described in the embodiment, but various modifications can be implemented.

The entire disclosure of Japanese Patent Application No. 2011-190648, filed Sep. 1, 2011 is expressly incorporated by reference herein.

What is claimed is:

1. An electronic apparatus comprising:
    a system device that performs a display control process of a display unit which displays an image; and
    a circuit device including:
        a first storage control unit which receives power from a power receiving unit which receives power by electromagnetic induction, to perform control of storing charge in a first charge storage unit;
        a second storage control unit which receives power from the power receiving unit to perform control of storing charge in a second charge storage unit; and
        a power source supply unit which supplies power source to the system device based on charges stored in the first charge storage unit and the second charge storage unit,
    wherein
        the second charge storage unit is a system-start-up charge storage unit whose charge storage capacitance is smaller than that of the first charge storage unit,
        during a power reception period, the first storage control unit performs control of storing an amount of charge sufficient to perform at least one display rewriting process of the display unit,
        the power source supply unit supplies, at the time of system start-up after the start of power reception by the power receiving unit, power source based on the stored charge of the second charge storage unit to the system device, during a display rewriting period following the power reception period, at the time of the system start-up, the system device is supplied with the power source based on the amount of charge stored in the first charge storage unit during the power reception period to perform a display rewriting process of the display unit, and when the length of the power reception period is defined as T1 and the length of the display rewriting period is defined as T2, the relationship of T2>T1 is satisfied.

2. The circuit device according to claim 1, wherein the at least one display rewriting process of the display unit comprises at least one process of rewriting the entire image displayed by the display unit.

3. The circuit device according to claim 1, wherein the power source supply unit supplies power source to the system device after a power supply voltage obtained by the stored charge of the second charge storage unit exceeds a minimum operating voltage of the system device.

4. The circuit device according to claim 1, wherein the power source supply unit includes
   a first diode which is disposed between a first storage node of the first charge storage unit and a connection node and whose forward direction is a direction from the first storage node toward the connection node and
   a second diode which is disposed between a second storage node of the second charge storage unit and the connection node and whose forward direction is a direction from the second storage node toward the connection node, and
the power source supply unit supplies power source to the system device based on a voltage at the connection node.

5. The circuit device according to claim 4, wherein the power source supply unit includes
   a switch circuit which is disposed between the connection node and an output node of the power source supply unit and
   a voltage detection circuit which detects a voltage at the connection node, and
the switch circuit is brought into ON state, when the voltage detection circuit detects that the voltage at the connection node exceeds a given threshold voltage, to supply power source to the system device.

6. The electronic apparatus according to claim 1, wherein the display unit is an electrophoretic display unit.

7. The electronic apparatus according to claim 1, wherein the system device performs the display rewriting process of the display unit based on data received during the power reception period.

8. The circuit device according to claim 1, wherein prior to the end of power reception by the power receiving unit, data reception is completed and the display rewriting process is started.

9. The circuit device according to claim 8, wherein the display rewriting process is completed after the end of power reception by the power receiving unit.

10. The circuit device according to claim 1, wherein the first charge storage unit is electrically connected between the first storage control unit and the power source supply unit,
the second charge storage unit is electrically connected between the second storage control unit and the power source supply unit.

11. The circuit device according to claim 1, wherein the first storage control unit performs control of storing charge necessary for only one display rewriting of the display unit in the first charge storage unit.

12. An IC card comprising:
a power receiving unit which receives power by electromagnetic induction;
a display unit which displays an image;
a system device which performs a display control process of the display unit; and
a power source management unit which receives power from the power receiving unit to supply power source to the system device, the power source management unit including:
   a first storage control unit which receives power from the power receiving unit to perform control of storing charge in a first charge storage unit, and
   a second storage control unit which receives power from the power receiving unit to perform control of storing charge in a second charge storage unit,
wherein
   during a power reception period, the first storage control unit performs control of storing an amount of charge sufficient to perform at least one display rewriting process of the display unit,
   at the time of system start-up after the start of power reception by the power receiving unit, the system device is supplied with power source based on the stored charge of the second charge storage unit,
   during a display rewriting period following the power reception period, at the time of the system start-up, the system device is supplied with the power source based on the amount of charge stored in the first charge storage unit during the power reception period, to perform a display rewriting process of the display unit, and
   when the length of the power reception period is defined as T1 and the length of the display rewriting period is defined as T2, the relationship of T2>T1 is satisfied.

13. The IC card according to claim 12, wherein the power source management unit includes
   a power source supply unit which supplies the power source to the system device based on the charges stored in the first charge storage unit and the second charge storage unit,
the second charge storage unit is a system-start-up charge storage unit whose charge storage capacitance is smaller than that of the first charge storage unit.

* * * * *